United States Patent Office 3,208,855
Patented Sept. 28, 1965

3,208,855
PROCESS OF MAKING BAKERY PRODUCTS
Duard W. Enoch, Kansas City, Mo., and Joseph F. Bogner, Shawnee Mission, William E. Dibble, Prairie Village, and Melvin M. Huber, Overland Park, Kans., assignors to Interstate Bakeries Corporation, Kansas City, Mo., a corporation of Delaware
No Drawing. Filed Oct. 10, 1962, Ser. No. 229,732
9 Claims. (Cl. 99—90)

The present invention relates to a process for the manufacture of bakery products and to a product.

We have discovered that by fatiguing the gluten in a flour and water dough that numerous unexpected advantages are achieved in the manufacture of bakery products, e.g., cake, bread, sweet goods, etc., made from the resulting product. By fatiguing the gluten, or failure of the gluten, we mean that as a result of working, the gluten loses its ability to hold the mass of dough together in the form sometimes referred to as a "dough ball." This may be determined by observation. Also, in a dough mixing apparatus of the type hereinafter referred to, it can be determined by a sharp decrease in the force (torque) required to work the dough at a given rate. At fatigue, the dough changes from a material that is heavier than water to one that is lighter than water.

A further explanation of how gluten is fatigued or fails will be found in a United States patent application, Serial No. 199,182, filed May 31, 1962, and entitled Rheological Testing Means and Method of Testing Wheat Flours, the disclosure of which is incorporated herein by reference. That application pertains to a novel test for evaluating the properties of flours, in which test a dough formed from the flour under consideration is worked until the gluten fails.

We have discovered that the use of a dough so worked has unexpected and meritorious advantages in the preparation of various bakery products, including both bread and cake. Based upon the prior art practices it would not have been expected that a process which facilitated or improved the manufacture of bread from a dough would have had any relationship to an improvement in a process of the preparation of a batter for cakes. This is due to the different types of flour used in bread vs. cake and the basic difference in the methods by which a mix for the preparation of the products is made. For example, in making bread a "strong" flour is employed, i.e., a flour having a strong gluten. In the preparation of the mix, gluten is developed in the flour and worked approximately to the point of maximum consistency. In contradistinction, the accepted flour for making cakes is a "weak" flour, i.e., a flour whose proteins will produce only a "weak" gluten. However, in making the mix for the cake, the process employed is one designed to curtail development of the gluten in the batter from which the cake is to be made.

One of the advantages achieved in all bakery products as a result of our invention is increased keeping qualities or prolonged shelf life. Bakery products become dry and hard, i.e., "stale," after a period of time following their manufacture. While many mistakenly believe that this is due to a loss of moisture to the air, this is not entirely true. This can be demonstrated by putting the bakery product in an enclosure in which substantially 100% humidity is maintained. The characteristics of a "stale" bakery product still will be exhibited under such humid conditions. Today in a good many commercial baking operations additives are included in the mix for the bakery product to prolong its apparent shelf life. Additives always are a controversial subject. Utilizing our invention, a bakery product can be produced which will have an improved shelf life although it does not include any such additive.

While we are not positive that we understand the mechanics by which the increased shelf life is obtained through the use of our process, it is our belief that it is achieved because the gluten has had its water requirements satisfied because of the processing. In a bakery product the sugar, starch and gluten all are fighting for water. Usually, during the processing, the first two will have their water requirements satisfied, but the water requirement of the gluten is not satisfied. The gluten in the finished product, made by a conventional process, drinks the available water from the adjacent ingredients causing the product to develop the dry characteristics of a stale item. We believe that through the use of our process, the water requirements of the gluten are more nearly satisfied. In any event, the keeping qualities of the resulting bakery product are improved.

A further general advantage of our invention is that it results in a more tender finished product. This not only permits, but actually requires a reduction in the amounts of other ingredients normally added to the mix to produce tenderness in the finished product. Typically these other ingredients are sugar and shortening. If a normal commercial formula is used in the manufacture of a cake for example, with all of the processing being the same except for the fact that the gluten in the flour was developed and fatigued (as hereinafter described) the resulting cake actually will be too tender. It is necessary that the other tenderizing materials be reduced. The same is true in the manufacture of bread, sweet goods, etc., in accordance with our invention as hereinafter described. To the extent that the quantities of sugar and shortening are reduced, there is an obvious monetary saving.

Referring specifically to the manufacture of cakes, a better tasting and eating cake is achieved. In the conventional cake process, everything is done to endeavor to avoid the development of gluten. There is no fermentation of the batter. As a result, cake has a different flavor from bread—what perhaps may best be described as a "flour" flavor. Cakes manufactured in accordance with our invention have a more desirable flavor and without the "flour" flavor. There is a better blending of the flavors of all the various ingredients. The cake is more tender and a cake of greater volume will be achieved from the same quantities of ingredients. As already mentioned, the cake will have a superior keeping power.

There are two conventional processes for the manufacture of bread. In what is commonly termed the "dough" process, a dough is developed and worked approximately to maximum consistency. This dough has strength and consistency primarily due to the development of the gluten in the flour. Yeast is incorporated into the dough, along with the other desired ingredients, the dough is then allowed to rise, ferment, for about three to four hours. The overall processing including dividing, rounding, intermediate proofing, molding, panning, pan proofing and baking is likely to be on the order of six to seven hours. In the variation known as the sponge and dough process, a part of the ingredients, including part of the flour, are fermented. Thereafter the remaining ingredients are mixed in with an additional, but shortened, fermentation period thereafter (commonly referred to as "floor time"). The overall time involved is roughly the same as that in the basic "dough" process. Both of these conventional processes necessarily are batch operations.

The principal distinguishing characteristics of bread result from the development of the gluten and the fermentation of the dough. The gluten development gives the dough strength and ultimately is exhibited in the texture of the finished product. The fermentation mellows and conditions the dough and produces the characteristic flavors of the finished product.

With continually rising labor costs, bakers have been seeking ways to automate the traditional batch processes. The traditional processes require experienced, trained employees and involve a substantial amount of hand labor. The required floor space is high because of the time involved for fermentation. On any given batch, work must commence long before the baking results. This often means undesirable work schedules. Automation of the conventional procedures is extremely difficult.

A further advantage of our invention is that it is ideally suited for automated operations with all the advantages attendant thereto. Time is the enemy of all automation and the conventional processes are time consuming. To the extent that there is a time lag between the taking of an action and the evidencing of the effects of that action, control or "feed back correction" becomes well-nigh impossible. If conventional bread manufacture and even in the continuous processes presently available, results are not evidenced until the bread is baked. This is a matter of hours from when the critical action, for which feed back correction is required, was taken.

A further factor that is extremely troublesome from an automation standpoint is the wide variation in the characteristics of ingredients which, unless corrected by experienced knowledge as the process proceeds, will change the results achieved. This is particularly true of flour in which the characteristics of what is presumably the same flour, will change from one batch to another. This is discussed at greater length in the above identified patent application.

One effort to automate the manufacture of bread utilizes a machine in which, in effect, the flour and water (which may include a fermented broth) are whipped at a high rate of speed on a continuous basis and for a very short period of time. While this process has produced a product which is sold as bread, its characteristics are more like that of cake. The process is a "whipping" process as distinguished from the "mixing" of conventional bread manufacture. The resulting product is readily distinguishable from conventional "bread."

In using our invention in the manufacture of bread, as hereinafter described, approximately four hours can be cut from the manufacturing time. The resulting bread will have the same general flavor and texture characteristics of a bread made by conventional processes. The word "general" is employed because actually the flavor and eating characteristics are superior to that of the conventional bread. It does not have the "flour" flavor which results from the cake type of manufacture mentioned in connection with the prior art automated bread process. Its toasting and keeping characteristics are superior to a conventional bread. The amount of tenderizing ingredients may be reduced.

As will hereinafter be seen, there is little fermentation with our process. Yet, despite the elimination of the principal fermentation time, the ultimate characteristics attributable to fermentation of dough in the conventional process are not necessarily lost. However, by reason of the elimination of substantially all of the fermentation time, the sugar in the dough which normally is used up by fermentation remains in the finished product. As a result, the sugar requirements can be further greatly reduced. The relatively short fermentation actually improves the flavor because there is less opportunity for side effects evident as undesirable odors and flavors which would result in poor taste. Our process of working the gluten to fatigue mellows the gluten to a point equal to, if not exceeding, that achieved by the four hours or so of fermentation in conventional bread manufacture.

The bread making process of our invention is ideally suited to being automated. One reason obviously is the much shorter overall manufacturing time which reduces the feedback lag. Another is that changes in the characteristics of the flour will immediately be apparent and can be corrected during the mixing process. It is not necessary to wait until baking has been completed to ascertain that the flour characteristics have changed and correction is required. An experienced baker is not required to determine that any such change has occurred.

Our invention advantageously might be employed in the manufacture of crackers. Conventionally, crackers are made from a strong flour with the dough being fermented for a period of about twelve to twenty-four hours. This long fermentation time mellows the gluten, but the space and equipment requirements to provide the holding facilities are high. Utilizing our invention the gluten may be conditioned in a period measured in minutes to an extent comparable to the mellowing of the gluten by such long fermentation times as cracker manufacture requires.

Furthermore, the quantities of sugar and fat employed in cracker manufacture are relatively high, e.g., about 15–20 pounds of fat and 20 pounds of sugar to each hundred pounds of flour. The tenderizing of the finished product achieved by our invention will permit a reduction in these ingredients. The sugar requirements will be further reduced by cutting the long fermentation time.

*Example 1.—Cake*

To 100 pounds of flour is added 110 pounds of water and the two mixed to a dough. The two are whipped at high speed. The dough goes through the dough ball stage characteristic of gluten development. The mixing or whipping is continued to the point of gluten fatiguge. The whipping preferably is carried out in an apparatus of the type illustrated and described in U.S. Patent No. 1,801,101, but other types of mixers may be employed provided they enable the working of the dough at a rate which will achieve gluten development and fatigue.

While the gluten is being fatigued, the remaining ingredients are mixed together and ceramed. The remaining ingredients would be flavoring (e.g., vanilla) 16 ounces, sugar 110 pounds, frozen egg whites 50 pounds, dry milk powder 10 pounds, salt 3 pounds, cake shortening 25 pounds, and baking powder 2½ pounds. These creamed ingredients are added to the fatigued dough in the mixer and the mixing continued for about one and one-half minutes. In all, the total processing time would be about five minutes. The batter thus produced is put into pans and baked in the conventiional manner.

A further example of a cake would be as follows. In this instance it would be a devil's food cake. To cake flour, 73 pounds, water in the amount of 77 pounds is added and the flour and water are whipped to fatigue of the gluten. In this instance as in all the fatiguing operations of gluten is developed in the flour and a dough ball stage is passed through in going to fatigue. The remaining ingredients are 86 pounds of sugar, 14½ pounds of cocoa, 13 pounds of dry milk powder, 2¼ pounds of salt, 1¾ pounds of baking powder, 1½ pounds of soda, 18 pounds of cake shortening, 29 pounds of fresh or frozen egg whites, 13 pounds of fresh or frozen fortified eggs (whole eggs plus additional yokes) and 20 pounds of water. These remaining ingredients are mixed together and whipped smooth. Thereafter they are added to the flour and water mixture which has been whipped to fatigue and the entire mix is whipped at high speed at the desired consistency. It is panned and baked in the conventional manner.

One of the previously discussed features of our invention can be illustrated in connection with this latter cake recipe. With the use of additional shortening therein, the same recipe may be employed to produce cake following conventional procedures. The amount of additional cake shortening necessary to do this would be about 23 pounds for a total amount of about 41 pounds of shortening incorporated therein. The saving of 23 pounds of shortening in one batch is alone remarkably significant.

*Example 2.—Bread*

The best process we have developed for making bread involves fatiguing the gluten in only a part of the total amount of flour employed. How large is this part will depend upon a number of factors, e.g., the strength of the gluten in the particular flour employed, the exact characteristics desired for the finished product, etc. As will be apparent to those skilled in the art from this disclosure, one would fatigue the gluten in as much of the flour as is possible consistent with achieving the overall end result desired. However, in carrying out the process commercially, a baker usually will not fatigue every last bit of flour that he could and still achieve the overall result. Rather, he will provide some leeway for occasional unintended changes in flour characteristics which might affect the end result, i.e., bread quality, were a border line operation in use. By fatiguing slightly less than the maximum amount of flour, a slight unintentional reduction in flour strength will not result in a poor product.

A further factor that will enable a baker to vary the proportion of flour in which the gluten is fatigued is the time period between the fatiguing of the gluten and the entering into the conventional steps of dividing, rounding, etc. To some extent the fatigued gluten will recover upon resting; and the longer the rest period provided, the greater is the proportion of flour that may be used in the part to be fatigued. The limit is how much can be employed in the part to be fatigued (how great a percentage of the whole) and still permit the baker to form a dough at the end, (after the addition of all ingredients). The fatigue point is readily ascertained as hereinbefore described.

The following specific example is based upon a recipe in which a total of 100 pounds of flour is employed. Eighty-five pounds of flour and 65 pounds of water are mixed together through optimum dough development and until fatigue of the gluten. An apparatus for performing this mixing is illustrated and described in a pending application of Duard W. Enoch, entitled, "Apparatus for Processing Dough," Serial No. 212,212 filed July 25, 1962, the disclosure of which is incorporated herein by reference. Included in the dough being fatigued is 3¾ pounds of compressed yeast and 7 ounces of yeast food.

After the fatigue of the gluten in the above dough, the remaining 15 pounds of flour is added, along with granulated sugar 8 pounds, lard 4 pounds, salt 2 pounds, and non-fat dry powdered milk 4 pounds. The fatigued dough plus these added ingredients are mixed to a normal dough consistency, i.e., normal development, for processing. The total dough processing time will be about 20 to 30 minutes. When the dough has been mixed to its normal consistency, it is given about 20 to 30 minutes of the floor time. Thereafter, the remaining conventional steps of dividing, rounding, intermediate proofing, molding, panning, pan proofing and baking are performed in the conventional manner.

It will be apparent that the fermentation time of the conventional process has been eliminated with the saving of about 4 hours of time. However, because of the elimination thereof, substantially no ethyl alcohol develops in the dough. Despite this lack of alcohol the average consumer would find the resulting product to be an acceptable bread. Its toasting and keeping qualities are superior. However, an expert (and perhaps the consumer upon side-by-side comparison) would believe it to be inferior to a bread made from a mix which incorporated ethyl alcohol. To achieve this end and still retain the advantages attendant lack of fermentation of the dough, alcohol can be added to the dough. For example, in the foregoing dough mix, 1 to 2 pounds of alcohol, e.g., ethyl alcohol, would be added initially to the 85 pounds of flour and the 65 pounds of water. After the fatigue of the gluten in this flour the remaining listed ingredients would be added except that the amounts of sugar, lard and milk would be reduced to the following quantities: sugar 7 pounds; lard 3 pounds; and milk 2 pounds.

Bread thus produced with the incorporation of alcohol has outstanding characteristics of flavor and appearance. Of course, its toasting and keeping qualities remain superior. The inclusion of the alcohol enables the baker to maintain better control over the bread production process. There is little possibility of the occurrence of variations or side effects. A reason for this is that the alcohol has an inhibiting effect upon yeast growth.

Bread conventionally is made from a strong flour. One of the principal reasons is to provide latitude in mixing time for the baker. Thus for some time before and after the point of optimum consistency of the dough there is little change in gluten characteristics. The mixing time is not unduly critical. However, strong flours generally are more expensive than weak flours.

Since in our process the initial mix of the dough is carried long past optimum consistency and to fatigue of the gluten, this requirement for a strong flour is not present insofar as the initial portion, e.g., 85%, of the total flour requirements is concerned. A baker can employ a weak flour for that portion in which the gluten is fatigued; using strong flour only for that portion added with the remaining ingredients in the second half of the mixing operation. With a favorable price differential for weak flour there is an obvious monetary saving.

Our process of bread making using dough in which gluten has been fatigued may be used to prepare all varieties of bread. This is a distinct advantage over the presently available "continuous" bread making processes. For practical purposes the latter is substantially limited to the manufacture of white and light wheat "breads."

The foregoing description of specific examples is for the purpose of complying with 35 USC 112 and should not be construed as imposing unnecessary limitations upon the appended claims inasmuch as modifications and variations will be apparent to those skilled in the art. For example, the specific quantities of ingredients can be changed in divers well known ways, and ingredients added, substituted and/or eliminated. To the extent that the term "water" is employed herein it is intended to include other ingredients which might be employed to provide a corresponding $H_2O$ content.

We claim:

1. In the process of making a mix of bakery ingredients, comprising at least flour and water, the improvement comprising: making a dough of flour and water and developing the gluten therein; working the dough until the gluten fails; and incorporating said dough into the bakery mix.

2. The method of eliminating the major part of the fermentation time in making bakery products from a mix which includes flour and water, said method comprising the steps of: mixing water with flour to form a dough; developing the gluten in the dough; working said dough until the gluten fails; and forming a mix which includes said dough having the gluten therein fatigued and yeast among the ingredients.

3. The method of claim 2, wherein ethyl alcohol is incorporated into the mix at approximately the same time as is the yeast.

4. The method of claim 2, wherein the yeast with some yeast food is incorporated into said dough before it is worked to gluten failure.

5. The method of making a batter for a cake having flour and water among the ingredients, said method comprising the steps of: making a dough of flour and water; developing the gluten in the dough; working said dough to gluten fatigue; and forming a batter of said dough with the remaining cake ingredients.

6. The method of claim 5, wherein the remaining ingredients first are creamed and then those creamed ingredients are mixed with the dough to a batter consistency.

7. In the process of making a mix of ingredients, including at least water and a given amount of flour, for the manufacture of bakery products, the improvement comprising: making a dough of water and less than said given amount of flour; working the dough until the gluten fails; and mixing the remaining flour into a dough, developing the gluten therein and incorporating it into the dough with the fatigued gluten.

8. In the process of making a mix of ingredients including at least water and a given amount of flour, for the manufacture of bakery products, the improvement comprising: making a dough of water and less than said given amount of flour; working the dough until the gluten fails; mixing the remaining flour into a dough, developing the gluten therein and incorporating it into the dough with the fatigued gluten; incorporating into the mix the additional ingredients for bread, including sugar, shortening and salt; working the mix to bread dough consistency and permitting it to rest; and thereafter making bread from said mix.

9. The process of claim 7, wherein the amount of said remaining flour is substantially less than the amount of flour used in making said dough in which the gluten was fatigued.

References Cited by the Examiner

UNITED STATES PATENTS

| | | | |
|---|---|---|---|
| 2,873,697 | 2/59 | Strahmann | 99—90 X |
| 2,874,052 | 2/59 | Bedenk | 99—92 X |
| 2,996,384 | 8/61 | Elsesser | 99—92 X |
| 3,006,765 | 10/61 | Ferrari | 99—90 |

OTHER REFERENCES

Heinka et al., "The Bakers Digest," vol. 34, No. 3, June 1960, pp. 36, 37, 40 and 41.

Matz, "The Chemistry and Technology of Cereals as Food and Feed," pp. 249 & 250, The Avi Pub. Co., Inc., Westport, Conn., 1959.

Pyler, "Baking Science and Technology," vol. II, pp. 393–400, Siebel Pub. Co., Chicago, Illinois, 1952.

Swanson et al., "Cereal Chemistry," vol. III, March 1926, No. 2, pp. 65 to 71 and 75 to 81.

A. LOUIS MONACELL, *Primary Examiner.*